United States Patent
Abend

(10) Patent No.: US 7,316,828 B2
(45) Date of Patent: Jan. 8, 2008

(54) PRESSURE-SENSITIVE ADHESIVES EXHIBITING AN IMPROVED SHEAR STRENGTH AT ELEVATED TEMPERATURES

(75) Inventor: Thomas P. Abend, St. Gallen (CH)

(73) Assignee: Bayer MaterialScience AG, Leverkusen (DE)

( * ) Notice: Subject to any disclaimer, the term of this patent is extended or adjusted under 35 U.S.C. 154(b) by 665 days.

(21) Appl. No.: 10/297,823

(22) PCT Filed: May 21, 2001

(86) PCT No.: PCT/EP01/05777

§ 371 (c)(1),
(2), (4) Date: Dec. 11, 2002

(87) PCT Pub. No.: WO01/96439

PCT Pub. Date: Dec. 20, 2001

(65) Prior Publication Data

US 2003/0157337 A1 Aug. 21, 2003

(30) Foreign Application Priority Data

Jun. 15, 2000 (EP) .................................. 00810518

(51) Int. Cl.
*B05D 5/10* (2006.01)
*B05D 3/02* (2006.01)
(52) U.S. Cl. .............. 427/208.4; 427/372.2; 427/385.5
(58) Field of Classification Search ............ 428/423.1; 526/931; 156/321, 322, 327, 331.1; 525/124; 528/45, 49, 75, 85, 902; 427/208, 208.4, 427/352, 372.2, 384, 385.5
See application file for complete search history.

(56) References Cited

U.S. PATENT DOCUMENTS

| 4,507,456 | A | * | 3/1985 | Blum et al. ................... 528/45 |
| 4,543,393 | A | * | 9/1985 | Blum et al. ................. 525/124 |
| 5,371,133 | A | | 12/1994 | Stanley ....................... 524/457 |
| 6,242,504 | B1 | | 6/2001 | Meyer-Roscher et al. |

OTHER PUBLICATIONS

Aqueous dispersions or solutions having a long shelf life and containing isocyanate-reactive polymers and surface-deactivating solid polyisocyanates, method for producing same and method for producing a layer—Loose Translation for Application LeA 35,536 (PCT/CH99/00577).

* cited by examiner

*Primary Examiner*—Thao Tran
(74) *Attorney, Agent, or Firm*—Noland J. Cheung; Robert S. Klemz

(57) ABSTRACT

The present invention relates to a process for preparing an adhesive bond by i) applying an aqueous dispersion or solution containing a) at least one isocyanate-reactive polymer and b) at least one solid surface-deactivated polyisocyanate to a ii) substrate, iii) drying the aqueous dispersion or solution at a temperature from 20 to 95° C. to form an adhesive layer and iv) treating the adhesive layer with heat at a temperature greater than the temperature used to dry the aqueous dispersion or solution. The present invention also relates to a process for preparing a bond by combining at least one substrate with the adhesive bond of the present invention.

Adhesive bonds of the present invention have a shear strength at least 10% greater than the shear strength of adhesive bonds containing a substrate having at least one adhesive layer based on an aqueous dispersion or solution composed of a) and b) dried at a temperature from 20 to 95° C.

13 Claims, No Drawings

PRESSURE-SENSITIVE ADHESIVES EXHIBITING AN IMPROVED SHEAR STRENGTH AT ELEVATED TEMPERATURES

FIELD OF THE INVENTION

The invention relates to a process for the preparation of pressure-sensitive adhesives having improved shear strength at elevated temperatures, produced from aqueous dispersions containing isocyanate-reactive polymers and solid surface-deactivated isocyanates.

BACKGROUND OF THE INVENTION

Industry and trade are nowadays seeking high-performance pressure-sensitive adhesives which are used in the construction sector for structural bonding in the form of single-sided and double-sided adhesive tapes as well as in the form of transfer adhesives. Such high-performance pressure-sensitive adhesives are distinguished by improved creep strength against static mechanical stresses even at temperatures above 100° C.

State of the art are high-performance pressure-sensitive adhesives which, after application to the carrier material, are crosslinked in the solvent-free state by irradiation in the ultraviolet region. The disadvantage of such systems is that the irradiation of the pressure-sensitive adhesive layer takes place on one side. The intensity of the UV light is greatest at the surface of the pressure-sensitive adhesive layer, that is to say at the surface which later constitutes the adhesive surface. Accordingly, the crosslinking density is also greatest at that surface. The instant adhesion and the surface tackiness suffer as a result, which can lead to immediate or subsequent adhesive failure of the adhesive bond.

That is the case especially when pressure-sensitive adhesive layers having a layer thickness greater than 80 μm or 100 μm are irradiated with UV light. High-performance pressure-sensitive adhesives having layers greater than 100 μm are used especially where the substrate surface exhibits increased roughness.

According to EP 904 853, improvements in such systems can be achieved by selective UV irradiation, for example through a perforated mask or template. There result highly crosslinked regions having a high mechanical bearing strength and reduced tackiness, together with regions of lower crosslinking density but having good surface tackiness.

The outlay in terms of apparatus and the costs for UV irradiation in general, and especially for UV radiation using a perforated mask, can be considerable. A further disadvantage is also that the UV irradiation can only be carried out on the high-performance pressure-sensitive adhesive in tape form. An alteration of the mechanical properties at the bonding is not normally possible for various reasons.

A further solution for producing high-performance pressure-sensitive adhesives is thermal after-crosslinking of the adhesive layer. There result pressure-sensitive adhesives which exhibit good instant adhesion and acceptable creep resistance before thermal activation and have high strength and static bearing strength after activation. The long exposure times of from 10 to 30 minutes at high activation temperatures in the range from 120 to 150° C. are a disadvantage of systems used hitherto. Examples are heat-activatable HAF films (based on epoxy or phenolic resin, copolyamide with epoxy crosslinker, phenolnitrile rubber) from Tesa Industries, Beiersdorf AG (D-Hamburg) or the heat-curing adhesive tape SBT 9245 from 3M (USA-St. Paul Minn.), described in G. Bennet et al.; Strukturelles Haftklebeband—Eine Innovation in der Klebetechnik; Conference Volume 10. Int. Symposium Swissbonding, CH-Rapperswil, 1996, p. 197-205.

The field of application of systems used hitherto is limited by the long exposure times. Many substrates become damaged if they are exposed to temperatures in the range from 120 to 150° C. for from 10 to 30 minutes. For that reason, systems having lower activation temperatures and/or exposure times are desirable.

An overview of pressure-sensitive adhesives, and especially of structural pressure-sensitive adhesives that are after-crosslinkable by UV irradiation or thermally, is given by P. L. Geiss, in "Verarbeitungskonzepte und Belastungskriterien für Haftklebstoffe" Hinterwaldner Verlag, Munich, 1998.

In the as yet unpublished Application PCT/CH99/00577 of the same Applicant, a reactive system for the preparation of spontaneously crosslinking pressure-sensitive adhesives is described. That system consists of an aqueous dispersion containing at least one isocyanate-reactive polymer and at least one surface-deactivated solid isocyanate. Features of the said dispersions are

- glass transition temperature Tg of the isocyanate-reactive polymer less than or equal to −5° C.
- storage modulus G' of the isocyanate-reactive polymer less than or equal to $10^7$ Pa, measured at 10 Hz and 10° C.
- minimum film-forming temperature MFT less than or equal to +5° C.
- mean particle diameter of the solid isocyanates less than or equal to 10 μm.

The object of the invention according to PCT/CH99/00577 is the preparation of aqueous dispersions or solutions containing solid, surface-deactivated polyisocyanates and isocyanate-reactive polymers, which are stable to storage in that form, that is to say in the form of aqueous dispersions or solutions, but in which, when applied in the form of a layer, partial crosslinking is initiated after removal of a substantial portion of the water.

SUMMARY OF THE INVENTION

Within the scope of further studies it has now been found, surprisingly, that the viscoelastic and mechanical pressure-sensitive adhesive properties of the resulting pressure-sensitive adhesive layer can be influenced to a considerable degree in a targeted and reproducible manner by heat treatment (b) of the pressure-sensitive adhesive layer.

A process is indicated hereinbelow for the preparation of a pressure-sensitive adhesive layer and for increasing its shear strength. The process according to the invention comprises the steps i) provision of an aqueous dispersion or solution containing at least one isocyanate-reactive polymer and a solid surface-deactivated polyisocyanate ii) application of the aqueous dispersion or solution to a substrate iii) production of a pressure-sensitive adhesive layer by removal of the water, the applied layer being dried preferably at a drying temperature (a) from +20° C. to +95° C. (measured in the layer), especially from +50° C. to +95° C., characterised in that in step iv) heat treatment (b) of the pressure-sensitive adhesive layer is carried out, wherein the layer is brought continuously, stepwise or directly to a temperature exceeding the drying temperature (a), which temperature exceeds the drying temperature (a) preferably by at least +40° C., and whereby the shear strength of the resulting adhesive bond is increased as a result of the heat treatment (b) by at least 10%, compared with the shear strength of the pressure-sensitive adhesive layer without heat treatment (b) and in that the isocyanate-reactive polymer and the solid surface-deactivated isocyanate are so selected that the pressure-sensitive adhesive layer produced in step iii) exhibits a loop tack of especially at least 2 N/inch.

DETAILED DESCRIPTION OF THE INVENTION

In a first step, the water is removed by drying (a) at drying temperatures in the range from 20° C. to 95° C., especially from 50° C. to 95° C., from the layer applied to a substrate by an aqueous dispersion or solution. There results a pressure-sensitive adhesive layer, preferably having a loop tack of at least 2 N/inch. The loop tack can be determined according to the FTM-9 method of FINAT (Federation Internationale des Fabricants et Transformateurs d'Adhesives et Thermocollants sur Papiers et autres Supports).

Within the scope of the invention, the pressure-sensitive adhesive layer is to be understood as being the substantially water-free form of the dispersion, especially having a loop tack of at least 2 N/inch. The term layer is defined in DIN EN 971-1: 1996-09.

According to the invention, the water is removed from the dispersion until a layer forms.

Suitable substrates for application of a layer of the aqueous dispersion or solution are various materials such as, for example, tapes or films. The aqueous dispersion or solution may be applied to one side or to both sides. In the said manner it is possible to prepare especially single- or double-sided pressure-sensitive adhesive tapes or transfer tapes having pressure-sensitive adhesive layers prepared in accordance with the invention.

The evaporation of the water and hence the formation of a pressure-sensitive adhesive layer can be carried out either at room temperature or at elevated temperatures up to a maximum of 95° C. (measured in the layer) and can be accelerated, for example, by streams of hot air or by streams of air of relatively low humidity. Drying temperatures in the range from 50 to 95° C. (measured in the layer) are particularly preferred.

Air temperatures from 110 to 125° C. are customary in industry on entry into the drying tunnel, which temperatures are reduced to from 90 to 95° C. towards the end of the drying line. The progression of the temperature and the exposure time in the drying tunnel can be so selected that the applied layer is not heated to temperatures above 95° C. Evaporation of the water can also be accelerated by simultaneous irradiation with infra-red light or with microwaves. The drying time is dependent substantially on the layer thickness. Drying times of, for example, 15 minutes at 20° C., 15 minutes at 50° C. or 5 seconds at 95° C. are thus conceivable, depending on the layer thickness.

In a second step, the shear strength of the pressure-sensitive adhesive layers prepared according to the invention can be influenced in a targeted and reproducible manner by heat treatment (b). The heat treatment (b) is carried out according to the invention at a temperature exceeding the drying temperature (a). A maximum temperature for the heat treatment (b) that exceeds the drying temperature (a) by at least 40° C. is particularly preferred. The shear strength of the resulting adhesive bond exceeds the shear strength of the pressure-sensitive adhesive layer before heat treatment by at least 10%.

The shear strength can be determined by the FTM-8 method of FINAT (Federation Internationale des Fabricants et Transformateurs d'Adhesives et Thermocollants sur Papiers et autres Supports).

Adhesive bond within the scope of the invention denotes substrates having at least one pressure-sensitive adhesive layer prepared according to the invention after heat treatment (b) has been carried out. They include especially single- or double-sided coated adhesive tapes, transfer tapes or bonds of one or more identical or different substrates.

The heat treatment (b) of the pressure-sensitive adhesive layer can be carried out immediately after the removal of water by drying (a) or at a later time. In the heat treatment, the pressure-sensitive adhesive layers prepared according to the invention are heated continuously, stepwise or directly, in such a manner that the shear strength of the heat-treated pressure-sensitive adhesive layer, or of the resulting adhesive bond, is increased by at least 10% as compared with the value prior to heat treatment (b).

Continuous heating within the scope of the invention is to be understood as meaning that heating is carried out with a constant increase in temperature (temperature gradient), for example 2° C./minute or 5° C./minute. In the case of stepwise heating within the scope of the invention, heating is carried out for different periods of time at different constant temperatures and/or with different temperature gradients. In direct heating, the pressure-sensitive adhesive is exposed in one step to a constant temperature that exceeds the drying temperature (a), especially to a temperature that exceeds the drying temperature (a) by at least 40° C.

The duration of the heat treatment (b) is dependent substantially on the reactivity of the isocyanate-reactive groups of the functional polymer contained in the aqueous dispersion. For example, the reactivity between primary hydroxyl and carboxyl groups under identical conditions differs approximately by a factor of up to 100. The second reaction partner, the solid isocyanates, has reactivities of the isocyanate groups that can likewise differ up to a factor of 100. Catalysts may likewise accelerate the reaction.

For those reasons, the time required for the heat treatment (b) must be determined by means of experiments. The duration of the heat treatment (b) ranges from a minimum of 5 seconds at 135° C. (or higher temperatures) to a maximum of 30 minutes at 90° C. (measured in the layer). Particular preference is given to a maximum temperature in the heat treatment (b) that exceeds the drying temperature (a) for removal of the water by at least 40° C.

The heat treatment (b) is ideally carried out in the range from 60° C. to 200° C., preferably from 90° C. to 180° C., the shear strength of the resulting adhesive bond being increased by at least 10% as compared with the shear strength of the pressure-sensitive adhesive layer prior to the heat treatment (b).

As a result of the heat treatment (b), the surface tackiness of the pressure-sensitive adhesive layers, for example measured as loop tack, should ideally not be less than 50% of the value prior to the heat treatment (b).

The heat required for the heat treatment (b) may be contact heat, convection heat, radiation heat in the visible or in the infra-red region. It is also possible to heat substrates by means of induction heat or by means of microwaves and thus transmit the heat to the adhesive tape and the adhesive layer. The pressure-sensitive adhesive layer may also be filled with inorganic, metallic or organic fillers which respond to the mentioned types of radiation.

The heat treatment (b) leads (in contrast to crosslinking by means of UV irradiation, especially using a perforated mask) to a macroscopically homogeneous adhesive layer having the same properties in all layers and throughout the entire cross-section.

As a result of the particular selection of the components in the aqueous dispersion or solution, pressure-sensitive adhesive layers are produced that can be thermally after-crosslinked at lower temperatures, especially at temperatures below 100° C., and/or with shorter exposure times, for example 5 seconds at 135° C. (or higher temperatures).

The aqueous dispersions or solutions must fulfil substantially the following requirements:
(a) the minimum film-forming temperature (MFT) according to DIN 53787:1974-02 is less than or equal to +5° C.;
(b) the glass transition temperature (Tg) of the isocyanate-reactive polymer must be less than or equal to −5° C.;
(c) the storage modulus G' of the isocyanate-reactive polymer must be less than or equal to $10^7$ Pa, measured at 10° C. and 10 Hz.

The viscoelastic parameters (glass transition temperature and storage modulus) of the films resulting from the dispersion are determined by DTMA (dynamic thermomechanical analysis) according to ISO 6721-1. Caloric measurements (DSC differential scanning calorimetry) can likewise be used. Standards for suitable methods are laid down in DIN 53765: 1994-03 and ISO 11357-2: 1996. A description of the dynamic thermomechanical properties and their determination is additionally contained in the Encyclopedia of Polymer Science and Engineering, Vol. 5; H. F. Mark ed.; New York 1986, p. 299 ff.

The isocyanate-reactive polymers can be prepared by copolymerisation of olefinically unsaturated monomers in solution, emulsion or suspension. They contain polymerised therein from 0.1 to 15%, preferably from 1 to 8%, monomers having isocyanate-reactive groups, such as hydroxyl, amino, carboxyl or acid amide and methylol acid amide groups.

Preference is given to hydroxy-, carboxy- and amino-functional dispersion copolymers of acrylic acid esters and methacrylic acid esters, acrylonitrile, vinyl acetate, diesters of maleic and fumaric acid, vinyl ethers, copolymers of ethylene with vinyl acetate, functional copolymers of styrene, butadiene, isoprene, α-chlorobutadiene. The molecular weights are generally from 100,000 to 800,000 Da, but may also be higher than 800,000 Da, especially when crosslinking monomers are used concomitantly.

There are also used water-soluble and water-dispersible polyurethane or polyurea dispersions, which are formed by the reaction of amorphous or semi-crystalline reactive polyesters, sulfopolyesters, polycaprolactones, polycarbonates and polyethers, which carry sulfoxyl, carboxyl, hydroxyl as well as primary or secondary amino groups, with aliphatic or aromatic polyisocyanates.

The solubility parameter δ of the anhydrous functional polymer should advantageously be in the range from 8.25 to 13.5 $(cal/cm^3)^{1/2}$. For the definition of the solubility parameter see Römpp Lexikon, Lacke und Druckfarben, Ed. U. Zorll, Stuttgart 1998, p. 361 ff.

The concentration of the isocyanate-reactive polymers in water is approximately from 20 to 80 wt. %, preferably from 30 to 70 wt. %, of the total weight of the dispersion or solution.

The pH value of the dispersion or solution is in the range from 6 to 10, preferably from 7 to 9. If necessary, the pH value can be brought into the desired range by addition of inorganic or organic bases or acids.

In the context of the present invention, the term dispersion is also to include emulsions, suspensions and polymer solutions.

Suitable solid polyisocyanates are any water-insoluble di- or poly-isocyanates or mixtures thereof, provided they have a melting point above +38° C. They may be aliphatic, cycloaliphatic, heterocyclic or aromatic polyisocyanates. Examples which may be mentioned are: diphenylmethane 4,4'-diisocyanate (4,4'-MDI), dimeric 2,4'- and 4,4'-MDI, naphthalene 1,5-diisocyanate (NDI), 3,3'-dimethyl-biphenyl 4,4'-diisocyanate (TODI), dimeric 1-methyl-2,4-phenylene diisocyanate (TDI-U), 3,3'-diisocyanato-4,4'-dimethyl-N, N'-diphenylurea (TDI-H), addition products of 2 mol of 4,4'-MDI with 1 mol of diethylene glycol, addition products of 2 mol of 1-methyl-2,4-phenylene diisocyanate with 1 mol of 1,2-ethanediol or 1,4-butanediol, addition products of 2 mol of hexamethylene 1,6-diisocyanate with 1 mol of 1,2-ethanediol, the isocyanurate of isophorone diisocyanate (IPDI-T).

The solid polyisocyanates should be in the form of powders having a mean particle diameter of less than or equal to 10 μm (weight average). Weight average within the scope of the invention is to be understood as meaning that, of 100 g of solid polyisocyanates, on average 50 g has a particle diameter less than or equal to 10 μm.

The solid polyisocyanates are generally obtained in the synthesis in the form of powders having the required particle diameter of 10 μm or less, otherwise they must be brought to the particle range according to the invention of less than or equal to 10 μm (before the deactivation reaction) by grinding, screening or sieving processes. Alternatively, the powdered polyisocyanates can be brought to a mean particle diameter of equal to or less than 10 μm by wet grinding and fine dispersion after the surface deactivation. Grinding, grading and measuring processes are state of the art.

The surface-stabilising reaction can be carried out in various ways:
  By dispersion of the powdered isocyanate in a solution of the deactivating agent.
  By introduction of a melt of a low-melting polyisocyanate into a solution of the deactivating agent in a non-solvent liquid dispersing agent.
  By addition of the deactivating agent or of a solution thereof to the dispersion of the solid finely divided isocyanates.

The solid polyisocyanates are preferably deactivated by the action of primary and secondary aliphatic amines, di- or poly-amines, hydrazine derivatives, amidines, guanidines. Ethylenediamine, 1,3-propylenediamine, diethylenetriamine, triethylene-tetramine, bis-hexamethylene-triamine, 2,5-dimethylpiperazine, 3,3'-dimethyl-4,4'-diamino-dicyclohexylmethane, methylnonane-diamine, isophoronediamine, 4,4'-diamino-diamino-dicyclohexylmethane, diamino- and triamino-polypropylene ether (Jeffamine), polyamidoamines and mixtures of mono-, di- and poly-amines have proved expedient.

The concentration of the deactivating agent should be from 0.1 to 20, preferably from 0.5 to 8 equivalent percent, based on the total isocyanate groups present in the solid isocyanate.

The equivalent ratio of the isocyanate groups of the surface-deactivated polyisocyanates and the isocyanate-reactive groups of the polymers should be in the range from 0.1 to 1.5. That corresponds generally to a concentration of the surface-deactivated solid isocyanate of from 0.1 to 10 parts by weight, preferably from 0.1 to 8 parts per 100 parts of solid isocyanate-reactive polymer.

The crosslinking density is given by the concentration of the solid isocyanate and by the concentration of the isocyanate-reactive groups, which are generally present in excess. The crosslinking density Mc should not fall below a value of Mc=3000 g/mol in the pressure-sensitive adhesives according to the invention. Mc is understood as being the mean molecular weight of the elastically acting chain length between the crosslinking sites. The degree of crosslinking can be demonstrated by the increase in temperature resistance under heat, by the absence of thermoplasticity at elevated temperatures, by the peel or shear strength under static load, change in surface tackiness, as well as by higher water resistance (in comparison with the uncrosslinked polymer). Crosslinking can also be demonstrated using analytical methods such as dynamic thermomechanical analysis (DTMA), gel or solubility determination.

The aqueous dispersion or solution optionally contains additional catalysts for the reaction of the isocyanate groups with the functional groups of the polymer.

Catalysts for the reaction of the isocyanate groups with the functional groups of the polymer are organic tin, iron, lead, cobalt, bismuth, antimony, zinc compounds or mixtures thereof. Preference is given to those catalysts which are hydrolytically stable in aqueous solution or dispersion. Alkyl mercaptide compounds of alkyltin are particularly suitable owing to their higher hydrolytic stability. Tertiary amines such as dimethylbenzylamine, diazabicyclooctane, as well as non-volatile polyurethane foam catalysts based on tertiary amines, such as, for example, methyldiethanolamine, can be used for specific purposes or in combination with metal catalysts.

The concentration of the catalysts is in the range from 0.001 to 1%, preferably from 0.01% to 0.1%, based on the solid reactive system.

The aqueous dispersions or solutions also optionally contain tackifying resins or low molecular weight, isocyanate-reactive compounds.

The addition of polar solvents, such as N-methylpyrrolidone, N-methylacetamide, dimethylformamide, propylene carbonate, dioxan, glycol monomethyl ether acetate, is also conceivable. However, such polar solvents may only be used if no damage to the deactivating layer on the solid isocyanates, the polyurea layer, takes place in the aqueous dispersion as a result.

The term plasticiser is to be understood as meaning liquid or solid, organic substances having low vapour pressure. They can interact physically with highly polymeric substances, with the formation of a homogeneous system, without a chemical reaction, preferably by their dissolving or swelling capacity, but sometimes even without such a capacity.

Low molecular weight polymers or resins, especially adhesion-promoting resins, may additionally be added to the aqueous dispersion or solution. Such polymers or resins have a molecular weight equal to or less than 5000 Da (weight average). The resins may be natural or synthetic, liquid or solid, they may be added in dispersed or emulsified form in water. They may be added in concentrations up to 100 solid parts per 100 parts of solid polymer.

As low molecular weight isocyanate-reactive compounds there may be used water-soluble or emulsifiable low molecular weight liquid polyols or/and polyfunctional amines. Examples are butanediol, trimethylolpropane, ethoxylated bisphenol A, methyldiethanolamine, triethanolamine.

In addition, further additives, especially inert additives, may be added to the aqueous dispersion or solution.

The expression inert additives is to be understood as meaning any additives or substances that do not have an effect either on the storage stability or on the crosslinking. The said group includes, for example, wetting agents, surface-active substances, auxiliary substances for controlling the flow behaviour or rheology, adhesion-promoting substances, organofunctional silanes, protective colloids, organic or inorganic thickeners, anti-foams, biocides, light stabilisers, ageing stabilisers, anti-corrosive agents, fillers, pigments, colourants.

The preparation of the dispersions takes place in known dispersing devices, such as dissolvers, stirrer mills, bead mills, rotor-stator mills, planetary mixing devices. It must be ensured that the surface-stabilised, finely divided polyisocyanates are not exposed to high shear forces, so that the urea layer on the surface is not destroyed. The mixing temperature of the reactive dispersions is in the range from +15 to +50° C., preferably below 35° C., depending on the nature of the solid polyisocyanates used.

It has proved expedient first to prepare concentrated liquid stock mixtures with the solid surface-stabilised polyisocyanates, which mixtures are added to the aqueous polymer dispersion or solution only once the components have been incorporated. The preparation of the stock mixtures takes place at temperatures from +5° C. to +30° C.

The pressure-sensitive adhesive layers and adhesive bonds produced according to the invention can be used in the form of single-sided and double-sided adhesive tapes as well as a carrier-free transfer adhesive.

As carriers for single-sided or double-sided pressure-sensitive adhesive tapes there may be used papers, cardboard, metal films, woven materials of organic and inorganic fibres, nonwovens, foams of acrylic, polyurethane, polyolefin materials. The carrier-free transfer adhesives can be applied to adhesive-repellent films, which have usually been silicone-treated on the surface.

Depending on the application, adhesive layers from 5 to 500 μm, preferably from 10 to 250 μm (measured dry) are applied.

The thermally after-treated pressure-sensitive adhesive layers are used in high-performance adhesives that are creep-resistant at elevated temperatures, in adhesive bonds in assembly and manufacturing processes, in statically loadable adhesive tape configurations in the fastenings sector. They can also be used for fastening bondings having higher temperature resistance and shear strength.

The heat treatment (b) can be carried out not only on the single- or double-sided pressure-sensitive adhesive tape or on the transfer tape, but also at the bonding of one or two identical or different substrates with the above-mentioned tapes, sections or die cut-outs. For example, an assembly bond with a tape having high aggressive tackiness and moderate shear strength can be converted by heat treatment (b) into a structural bond having high shear strength, temperature resistance and moderate surface tackiness.

The pressure-sensitive adhesive layers and adhesive bonds produced according to the invention can be used for a wide variety of other applications and are not limited to those mentioned above. The present invention is further illustrated by the following Examples.

EXAMPLES

Methods and Materials Used

Pressure-Sensitive Adhesive Aqueous Polymer Dispersions

AC 7506 Copolymer of butyl acrylate, 2-ethylhexyl acrylate and acrylic acid, carboxy-functional. Approx. 65% solid constituents. Molecular weight>500,000 Da, MFT<5° C., Tg −30° C., storage modulus $G'=10^6$ Pa at 10 Hz and 10° C.

AC 7522 Copolymer of 2-ethylhexyl acrylate, 2-hydroxyethyl (meth)acrylate, a small amount of acrylic acid and crosslinking diacrylate, predominantly hydroxy-functional. Approx. 68% solid constituents. Molecular weight>500,000 Da, MFT<5° C., Tg −43° C., storage modulus $G'=7.5\times10^5$ Pa at 10 Hz and 10° C.

Manufacturer Alberdingk Boley GmbH, D-Krefeld

Processing of the Dispersions
1) Coating weight approx. 30 g/m² (measured dry) on polyester film substrate
2) Process (a): dried in a stream of air at 60° C. for 10 minutes
3) Process (b): heat treatment at 100° C. for 15 minutes
4) Tested after 24 hours after drying (a) or heat treatment (b)

Testing of the Pressure-Sensitive Adhesives and Bonds

Testing was carried out in accordance with the test methods of FINAT (Federation Internationale des Fabricants et Transformateurs d'Adhesives et Thermocollants sur Papiers et autre Supports), with the exception of the SAFT value (shear adhesion failure temperature) according to Ford and the tensile-shear strength according to DIN 53503.

| | |
|---|---|
| FTM 1 | Adhesive force (180° peel resistance), with indication of the type of failure (cohesive, with fracture in the adhesive; adhesive, adhesive separates from the substrate) |
| FTM 8 | Shear strength or shear resistance under static load; indication: minutes to failure of the site of adhesion |
| FTM 9 | Surface tackiness (quick stick and loop method) |
| SAFT | Ford method. Temperature increase in each case 5° C. per 10 minutes, under static load with 0.9 N/cm². Indication: temperature ° C on failure of the site of adhesion |

Examples 1-3

Preparation of Aqueous Dispersions (Stock Solutions) of Surface-Deactivated Isocyanates with Approx. 33% Solid

| Constituents used | | |
|---|---|---|
| (1) (5) | Water | deionised |
| (2) | Kelzan S | hydrocolloid, dispersion stabiliser |
| (3) | Tween 85 | polyoxyethylene sorbitan trioleate |
| (4) | Jeffamine T-403 | triamine, NH equivalent weight 146 g/eq. |
| (6) | IPDI-T | Isophorone diisocyanate trimer (Metalink IT, Acima AG, CH-Buchs) mean particle size approx. 1.8 μm |
| (7) | TDI-H | 2,4-TDI-urea (Metalink H, Acima AG, CH-Buchs) mean particle size approx. 4.5 μm |
| (8) | TDI-U | 2,4-TDI-uretdione (Metalink U, Acima AG, CH-Buchs) mean particle size approx. 4.5 μm |

| Stock solution (g) | Example 1 with IPDI-T | Example 2 with TDI-H | Example 3 with TDI-U |
|---|---|---|---|
| (1) water, deionised | 94.5 | 94.5 | 94.5 |
| (2) Kelzan S | 0.5 | 0.5 | 0.5 |
| (3) Tween 85 | 1.0 | 1.0 | 1.0 |
| (4) Jeffamine T-403 (0.01 eq.)* | 1.55 | 1.55 | 1.55 |
| (5) dissolved in water | 5.0 | 5.0 | 5.0 |
| (6) IPDI-T (0.217 eq.)* | 52.00 | | |
| (7) TDI-H (0.305 eq.)* | | 52.00 | |
| (8) TDI-U (0.288 eq.)* | | | 52.00 |
| (9) Total | 154.55 | 154.55 | 154.55 |

*from 3.3 to 4.6 equivalent % of the isocyanate groups deactivated

The stock solutions were stirred with the dissolver into the aqueous pressure-sensitive adhesive polymer dispersions at 1200 rpm.

Examples 4-8

Dispersion of deactivated IPDI-T, dispersed in AC 7506 (copolymer of butyl acrylate, 2-ethylhexyl acrylate and acrylic acid, carboxy-functional)

| Example | 4 | 5 | 6 | 7 | 8 |
|---|---|---|---|---|---|
| IPDI-T; phr | 0 | 0.5 | 0.5 | 1.5 | 1.5 |
| process/ temperature ° C. | (a)/60 | (a)/60 | (a)/60 (b)/100 | (a)/60 | (a)/60 (b)/100 |
| Loop tack FTM-9; N/in. | 7.9 | 7.7 | 6.4 | 7.1 | 4.9 |
| Quick stick FTM-9; N/in. | 27.6 | 26.1 | 19.7 | 24.0 | 17.4 |
| FTM-8; shear strength at room temperature, 10 N/cm² load, minutes to failure | 8 | 12 | 31 | 13 | 63 |
| FTM-8; shear strength at 70° C., 2 N/cm² load, minutes to failure | 14 | 17 | >5000 | 20 | >5000 |
| SAFT (Ford TM) Δ5° C./10 minutes Failure temp. ° C. | 88 | >150 | >150 | >150 | >150 |
| Tensile-shear strength, N/cm², DIN 53503 | 48.9 | 51.2 | 53.5 | 51.7 | 54.8 |

Examples 5 to 8 clearly show the effect of the addition of small amounts of surface-deactivated micronised isocyanates (cf. Example 4) and the enormous increase in shear strength or shear resistance on heat treatment at 100° C., as compared with adhesive layers which were dried at 60° C. (Examples 5 to 8).

The adhesion values (loop tack and quick stick) are only moderately impaired by the heat treatment (b). The SAFT values in Examples 5 and 7 are already above the industrially required values of +150° C. without further heat treatment. The tensile-shear values are scarcely affected by the addition of the surface-deactivated micronised isocyanates.

Examples 9-12

Dispersion of deactivated TDI-U, dispersed in AC 7522, copolymer of 2-ethylhexyl acrylate, 2-hydroxyethyl (meth) acrylate, a small amount of acrylic acid; predominantly hydroxy-functional.

| Example | 9 | 10 | 11 | 12 |
|---|---|---|---|---|
| TDI-U; phr | 0.168 | 0.168 | 0.672 | 0.672 |
| process/ temperature ° C. | (a)/60 | (a)/60 (b)/100 | (a)/60 | (a)/60 (b)/100 |
| Loop tack FTM-9; N/in. | 9.8 | 7.1 | 9.1 | 6.3 |
| FTM-8; shear strength at room temperature, 10 N/cm² load, minutes to failure | 39 | 995 | 48 | >5000 |
| FTM-8; shear strength at +100° C., 2 N/cm² load, minutes to failure | 160 | >5000 | >5000 | >5000 |
| FTM-1; adhesive force (180° peel resistance) N/in. | 22.0 | 18.1 | 18.7 | 16.3 |
| Type of failure (cohesive = c; adhesive = a) | 50% c | 25% c 75% a | 100% a | 100% a |

Examples 11 to 13 show that TDI-U as the aromatic isocyanate is more reactive than IPDI-T, in addition it has a lower equivalent weight. With a smaller amount used it leads to greater crosslinking and hence to higher shear strength at room temperature and at higher temperatures. The fact that the polymer is hydroxy-functional and hence more reactive than the carboxy-functional AC 7506 also makes a further contribution.

By means of the choice and concentration of the solid isocyanate and of the functional groups of the polymer, it is possible to control the cohesive properties to complete adhesive separation from the substrate in the peel test.

Examples 13 to 16

Dispersion of deactivated TDI-H, dispersed in AC 7522, copolymer of 2-ethylhexyl acrylate, 2-hydroxyethyl (meth) acrylate, a small amount of acrylic acid; predominantly hydroxy-functional.

| Example | 13 | 14 | 15 | 16 |
|---|---|---|---|---|
| TDI-H; phr | 0.168 | 0.168 | 0.672 | 0.672 |
| process/ temperature ° C. | (a)/60 | (a)/60 (b)/100 | (a)/60 | (a)/60 (b)/100 |
| Loop tack, FTM-9; N/in. | 10.1 | 7.8 | 10.0 | 6.1 |
| FTM-8; shear strength at room temperature, 10 N/cm² load, minutes to failure | 24 | 48 | 29 | 64 |
| FTM-8; shear strength at 100° C., 2 N/cm² load, minutes to failure | >5000 | >5000 | >5000 | >5000 |
| FTM-1; adhesive force (180° peel resistance) N/in. | 17.1 | 22.3 | 16.1 | 21.2 |
| Type of failure (cohesive = c; adhesive = a) | 25% c 75% a | 100% a | 100% c | 100% c |

TDI-H contains aromatic isocyanate groups, it has a low equivalent weight compared with TDI-U and has different dissolution and reaction behaviour.

The Examples show that certain properties already exhibit a maximum on drying at 60° C. In the case of drying at 60° C., the system already has predominantly cohesive properties, in the case of heat treatment at 100° C. it develops adhesion to the substrate: the adhesive properties result in the cohesive properties being inferior to the adhesive properties in the peel test according to FTM-1.

The invention claimed is:

1. A process for preparing a pressure-sensitive adhesive layer on a substrate comprising:
   i) applying an aqueous dispersion or solution containing:
      a) at least one isocyanate-reactive polymer; and
      b) at least one solid surface-deactivated polyisocyanate
      to at least one surface of said substrate;
   ii) drying the aqueous dispersion or solution at a temperature of from 20 to 95° C. to form an adhesive layer that exhibits a loop tack of at least 2 N/inch;
   iii) treating said adhesive layer with heat at a temperature that exceed the drying temperature by at least 40° C. to thereby produce a pressure-sensitive adhesive layer having a shear strength higher than the shear strength of said adhesive layer.

2. The process of claim 1 wherein the drying temperature is from 50 to 95° C.

3. The process of claim 1 wherein the treatment with heat is carried out at a temperature from 60 to 200° C.

4. The process of claim 1 wherein the treatment with heat is carried out with direct heat, convection heat, radiation heat, electromagnetic radiation or by heat transfer from a preheated substrate.

5. The process of claim 1 wherein the isocyanate-reactive polymer has a glass transition temperature less than or equal to −5° C.

6. The process of claim 1 wherein the aqueous dispersion or solution has a minimum film-forming temperature less than or equal to +5° C.

7. The process of claim 1 wherein the isocyanate-reactive polymer has a storage modulus less than or equal to $10^7$ Pa, measured at 10 Hz and +10° C.

8. The process of claim 1 wherein the solid surface-deactivated polyisocyanate has a mean particle diameter (weight average) less than or equal to 10 μm.

9. The process of claim 1 wherein the isocyanate-reactive polymer is an acrylic ester, methacrylic ester, acrylonitrile, vinyl acetate, styrene, ethylene, a butadiene or α-chlorobutadiene copolymer, a polyester- or polyether-based polyurethane or a polyester- or polyether-based polyurea.

10. The process of claim 1 wherein the ratio of isocyanate groups of the polyisocyanate to isocyanate-reactive groups of the polymer is in the range of from 0.1 to 1.5.

11. The process of claim 1 wherein said pressure sensitive layer has a crosslinking density of at least 3000 g/mol.

12. The process of claim 1 wherein said pressure-sensitive adhesive layer has a surface tackiness that is reduced by no more than 50% of the surface tackiness of said adhesive layer.

13. The process of claim 1, wherein the shear strength of said pressure-sensitive layer exceed the shear strength of said adhesive layer by at least 10%.

* * * * *